United States Patent [19]

Nakakuki

[11] Patent Number: 4,748,389
[45] Date of Patent: May 31, 1988

[54] MOTOR SPEED CONTROL APPARATUS

[75] Inventor: Junichi Nakakuki, Osaka, Japan

[73] Assignee: Matsushita Electric Industrial Co., Ltd., Osaka, Japan

[21] Appl. No.: 928,275

[22] PCT Filed: Feb. 13, 1986

[86] PCT No.: PCT/JP86/00063

§ 371 Date: Oct. 17, 1986

§ 102(e) Date: Oct. 17, 1986

[87] PCT Pub. No.: WO86/05042

PCT Pub. Date: Aug. 28, 1986

[30] Foreign Application Priority Data

Feb. 18, 1985 [JP] Japan ................... 60-29617
Feb. 18, 1985 [JP] Japan ................... 60-29618
Feb. 18, 1985 [JP] Japan ................... 60-29619

[51] Int. Cl.⁴ .............................................. H02P 5/00
[52] U.S. Cl. ..................... 318/345 D; 318/331; 318/434; 318/341; 318/334
[58] Field of Search .............. 318/309, 310, 311, 314, 318/316, 317, 318, 326, 327, 328, 329, 330, 331, 332, 333, 334, 341, 345, 439, 434, 606, 607, 608, 599, 615, 616, 617, 391

[56] References Cited

U.S. PATENT DOCUMENTS

| | | | |
|---|---|---|---|
| 3,629,615 | 12/1971 | Gurwicz | 318/345 C X |
| 3,868,554 | 2/1975 | Konrad | 318/345 C X |
| 4,171,532 | 10/1979 | Sloan et al. | 318/345 G X |
| 4,195,254 | 3/1980 | Gurwicz et al. | 318/334 |
| 4,303,874 | 12/1981 | Iwai | 318/331 |
| 4,358,730 | 11/1982 | Beifus | 318/345 D X |
| 4,369,403 | 1/1983 | Lee | 318/345 D X |
| 4,417,187 | 11/1983 | Bateika | 318/331 |
| 4,503,370 | 3/1985 | Cuneo | 318/331 |
| 4,504,769 | 3/1985 | Fushiya et al. | 318/345 H |
| 4,517,502 | 5/1985 | Aschoff et al. | 318/334 X |
| 4,524,309 | 6/1985 | Hisatake et al. | 318/434 |
| 4,574,226 | 3/1986 | Binder | 318/334 X |
| 4,658,692 | 4/1987 | Bagus | 318/341 X |

Primary Examiner—William M. Shoop, Jr.
Assistant Examiner—Paul Ip
Attorney, Agent, or Firm—Lowe, Price, LeBlanc, Becker & Shur

[57] ABSTRACT

The motor speed control apparatus of the present invention includes a thyristor (14) connected in the current supply circuit of a motor (13) for phase controlling the motor to control its rotational speed. The determination of the trigger timing of the thyristor in the event that the actual trigger timing would occur at a point after the occurrence of a zero voltage point of the mains supply voltage, is made at a point in time advanced by an amount corresponding to the delay time between the time prior to a speed change and the time following the speed change, whereby the motor speed is rendered constant.

9 Claims, 7 Drawing Sheets

MOTOR SPEED CONTROL APPARATUS

FIELD OF THE INVENTION

The present invention relates to a speed control apparatus for a motor which stabilizes the speed of the motor under a varying torque when the motor operates at a low speed.

BACKGROUND ART

Figure 7:
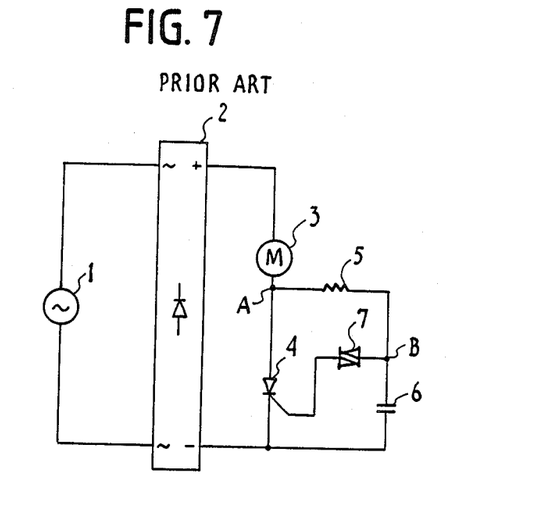
FIG. 7 is a circuit diagram of a prior art motor speed control apparatus and FIG. 8 is a waveform diagram of the prior art apparatus.

The motor speed control apparatus of this type is shown in FIG. 7. As shown, a DC motor 3 and a thyristor 4 are connected to the DC output of a full-wave rectifier 2 which is connected to the terminals of an AC mains supply 1. Across the terminals of the thyristor 4 is connected a resistor 5 and a capacitor 6 in a series circuit so that when the thyristor 4 is in a turned-off state, the capacitor 5 is charged through the resistor 5. Capacitor 6 is discharged through a bidirectional breakdown diode, or diac 7 which is coupled between the gate of thyristor 4 and one end of the capacitor 6 when the voltage across the capacitor 6 reaches a predetermined level.

Figure 8:
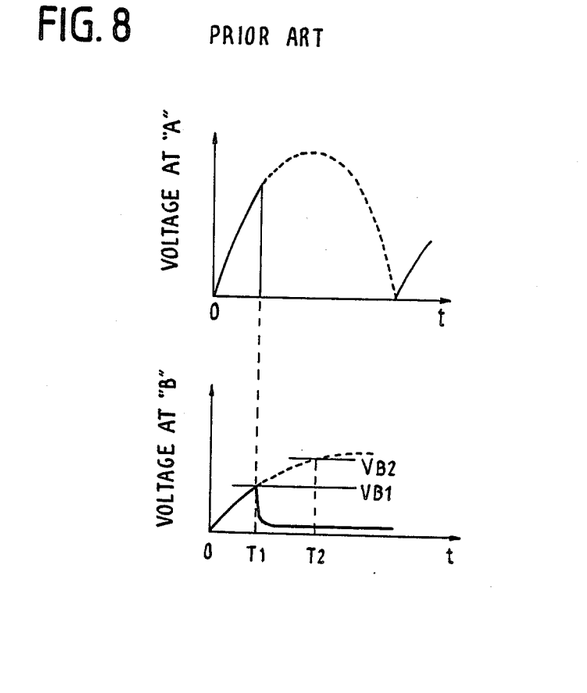

More specifically, if the anode of thyristor 4, shown at A in FIG. 7, is impressed with a voltage having a substantially sinusoidal waveform as shown in FIG. 8, the voltage of the capacitor 6 developed at point B increases gradually and the bidirectional breakdown diode 7 is turned on when it reaches its breakdown voltage $V_{B1}$ at time $T_1$, turning the thyristor 4 on to control the phase of the motor 3.

In this way, the capacitor 6 is charged with a voltage which is equal to the difference between the mains supply voltage and the counter EMF (electromotive force) generated in the motor 3 so that it operates at a low speed. Under this low speed condition, the prior art apparatus operates to maintain the speed of the motor 3 constant under varying torque.

However, the prior art apparatus suffers from speed instability when the motor is operated at a still lower speed. Assume that the breakdown voltage of the diac 7 is raised $V_{B1}$ to to $V_{B2}$ as shown in FIG. 8 in an attempt to reduce the motor speed, the rate of voltage increase at point B decreases gradually and the breakdown occurs at time $T_2$. Thus, the increase in breakdown voltage results in a disproportionally large shift in breakdown time. This implies that the motor would suffer speed instability if an attempt is made to lower the motor operating speed by merely increasing the breakdown voltage.

Furthermore, if the mains supply voltage has increased, the voltage at point A increases, causing the charging time to reduce with a resultant decrease in trigger intervals. Thus, the motor speed increases with an increase in mains supply voltage.

SUMMARY OF THE INVENTION

The motor speed control apparatus of the present invention includes a thyristor connected in a motor current circuit to phase control the motor. When the motor speed is to be reduced by delaying the thyristor trigger timing, the trigger timing occurs at a point in time which is advanced by an amount equal to the interval between the time prior to the occurrence of a speed change and the time following the occurrence of the speed change if the thyristor trigger timing would otherwise be delayed significantly from the zero voltage point of the mains supply. As a result, the motor speed stabilization is ensured even though the speed is low.

BEST MODE FOR CARRYING OUT THE INVENTION

Figure 1:
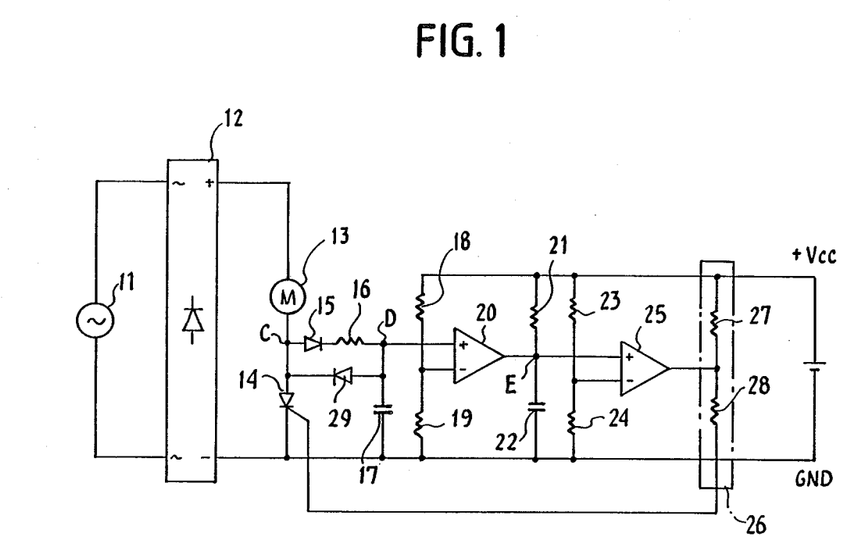
FIG. 1 is a circuit diagram of a motor speed control apparatus according to an embodiment of the present invention.

The following is a description of an embodiment of the present invention with reference to the accompanying drawings. FIG. 1 illustrates a circuit diagram of an embodiment of the motor speed control apparatus of the invention. In FIG. 1, numeral 11 indicates an AC mains supply across which is connected a full-wave rectifier 12. A DC motor 13 and a thyristor 14 are connected in series across the DC output terminals of the full-wave rectifier 12.

A first capacitor 17, which is coupled through a diode 15 and a resistor 16 in series with the thyristor 14, is charged with a voltage which is the difference between the mains supply voltage and the counter EMF of the motor 13 when the thyristor 14 is in a turned-off state. When the voltage developed in the first capacitor 17 reaches a level determined by resistors 18 and 19, the output of a first comparator 20 switches from a low to a high level to trigger the thyristor 14 into conduction.

When the first comparator 20 switches a high output state, a charging operation begins to charge a second capacitor 22 through a resistor 21. When the voltage across the second capacitor 22 exceeds a voltage determined by resistors 23 and 24, the output of a second comparator 25 switches from a low to a high voltage. The time interval between the time at which the charging of the second capacitor 22 begins and the time at which the second comparator 25 switches to the high output state determines the delay time.

When the second comparator 25 switches to a high output state, the thyristor 14 is triggered through a trigger circuit 26. More specifically, the switching of the second comparator 25 from low to high output state causes a current to be supplied from a voltage supply +Vcc through resistors 27 and 28 to the gate of the thyristor 14. When the thyristor 14 is triggered, the first capacitor 17 is discharged through a diode 29 in preparation for the phase control during the next cycle of the mains supply.

Figure 2:
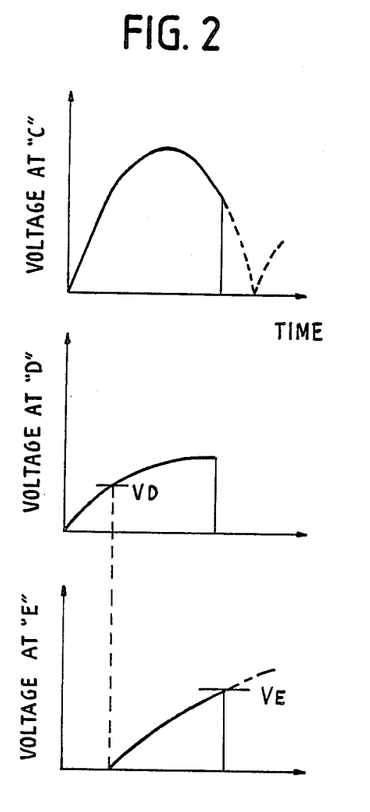
FIG. 2 is a waveform diagram showing various waveforms appearing in the apparatus.

Voltages appearing at various points of the circuit of FIG. 1 are shown in FIG. 2. When the voltage across the first capacitor 17 exceeds a predetermined voltage $V_D$, the charging of the second capacitor 22 begins.

When the voltage of the second capacitor 22 exceeds a predetermined voltage $V_E$, the thyristor 14 is triggered. Since the voltage at point C has reduced to a low level at this point of time and since the voltage at point D is still low, the determination of trigger timing by the voltage at point D would result in instability in phase control. However, the present invention provides the determination of trigger timing during the time the voltage at point C is still rising and therefore the motor control operation of the invention is rendered significantly stable.

In addition, since the voltage that charges the first capacitor 17 is the difference between the mains supply voltage and the counter EMF of the motor 13, the influences caused by a variation of torque on the motor 13 can be reduced to a minimum.

Figure 3:
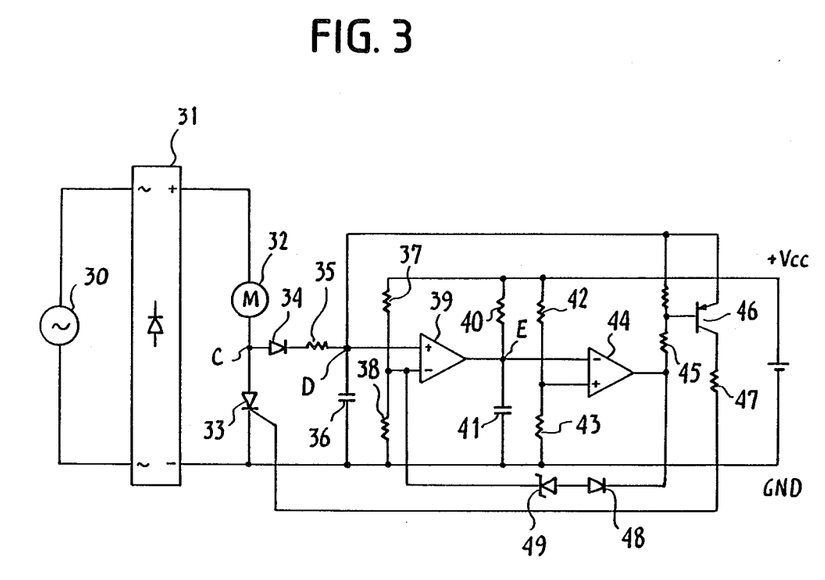
FIG. 3 is a circuit diagram of a motor speed control apparatus according to another embodiment of the present invention.

FIG. 3 is a circuit diagram of another embodiment of the motor speed control apparatus of the present invention in which numeral 30 indicates the mains supply across which a full-wave rectifier 31 is connected. To the DC output of the full-wave rectifier 31 is connected a series circuit including a DC motor 32 and a thyristor 33.

A first capacitor 36, connected in series through a diode 34 and a resistor 35 across the terminals of the thyristor 33, is charged with a differential voltage between the mains supply and the counter EMF of the motor 32 when the thyristor 33 is in an OFF state. When the voltage across the first capacitor 36 reaches a voltage determined by resistors 37 and 38, the output of a first comparator 39 switches from a low to a high voltage level and determines the trigger timing of the thyristor 33.

When this occurs, a charging current starts flowing through a resistor 40 to a second capacitor 41. When the voltage developed in the second capacitor 41 exceeds a level determined by resistors 42 and 43, the output of a second comparator 44 changes from a high to a low voltage level. The time interval between the time at which the charging of the second capacitor 41 begins and the time at which the second comparator 44 switches to the low output state determines the delay time.

When the output of the second comparator 44 switches from high to low levl, a switching means (hereinafter called transistor) 46 is driven by way of a resistor 45, causing a voltage to be supplied to the gate of the thyristor 33 through a resistor 47 from the first capacitor 36 to turn it on. At the same time, the voltage determined by the dividing ratio between resistors 37 and 38 is reduced to the voltage determined by a reference voltage varying means (hereinafter called Zener diode) 49.

By a discharging operation of the first capacitor 36, the voltage across the first capacitor 36 is reduced to the zener voltage of the Zener diode 49 and the thyristor 33 is turned off in preparation for the phase control during the next cycle of the mains supply.

Figure 4:
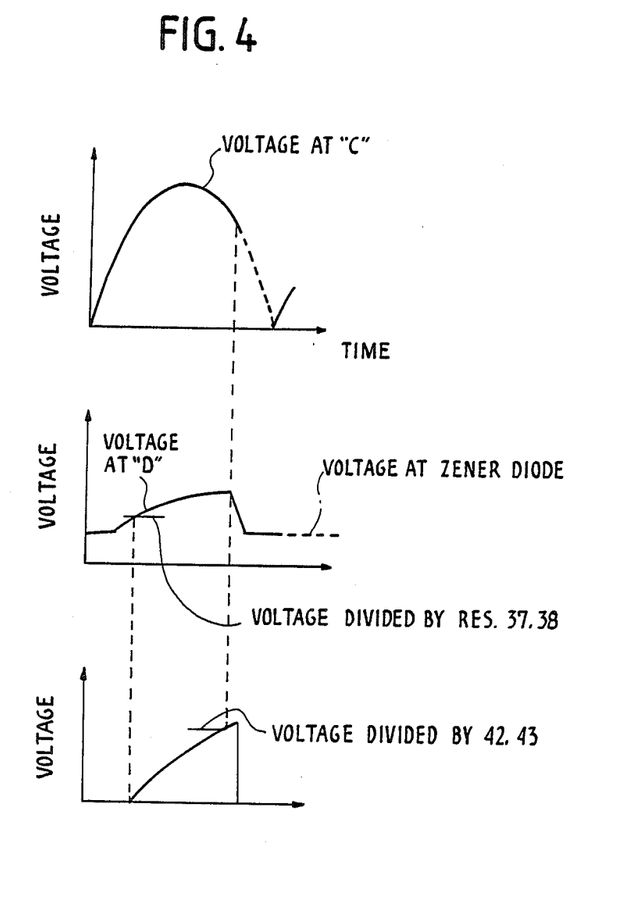
FIG. 4 is a waveform diagram associated with the embodiment of FIG. 3.

FIG. 4 shows waveforms appearing in the circuit of FIG. 3. When the voltage across the first capacitor 36 exceeds the voltage divided by the resistors 37 and 38, the charging current starts flowing through the second capacitor 41 and when the voltage developed therein exceeds the voltage determined by the resistors 42 and 43, the thyristor 33 is turned on. At this time, the voltage at point C has reduced to a low level and the potential at point D is still low. Thus, if the trigger timing is determined by the voltage at point D, the operation of the apparatus would become unstable. However, the present invention determines the trigger timing during the time the voltage at point C is still rising and therefore a stabilized operation can be obtained.

In addition, the voltage that charges the first capacitor 36 is the difference between the mains supply voltage and the counter EMF of the motor 32, the influence caused by the torque variation of the motor 32 can be reduced to a minimum.

Furthermore, since the trigger current of the thyristor 33 is as large as several tens of milliamperes, it represents an overload for a DC voltage supply $+V_{cc}$ if it serves a trigger current source. Instead, the present invention utilizes the first capacitor 36 as a trigger current source for the thyristor 33. As a result, the motor speed control apparatus of the invention can be implemented by a simplified circuit configuration while at the same time reducing the power requirement of the gate circuit of the thyristor 33.

Figure 5:
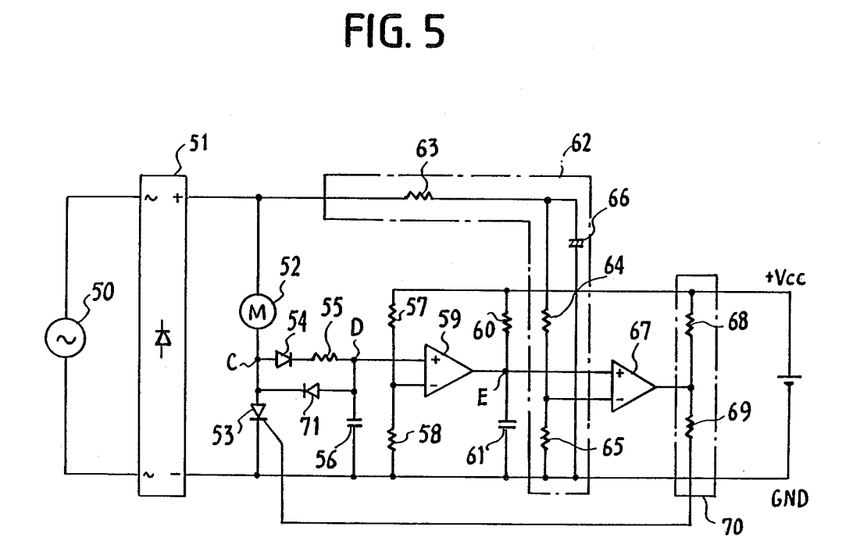
FIG. 5 is a circuit diagram of a motor speed control apparaus according to a still further embodiment of the present invention.

FIG. 5 is a circuit diagram of another embodiment of the motor speed control apparatus of the present invention in which numeral 50 indicates the mains supply across which a full-wave rectifier 51 is connected. To the DC output of the full-wave rectifier 31 is connected a series circuit including a DC motor 52 and a thyristor 53.

A first capacitor 56, connected in series through a diode 54 and a resistor 55 across the terminals of the thyristor 53, is charged with a differential voltage between the mains supply and the counter EMF of the motor 52 when the thyristor 53 is in an OFF state. When the voltage across the first capacitor 56 reaches a voltage determined by resistors 57 and 58, the output of a first comparator 59 switches from a low to a high voltage level and determines the trigger timing of the thyristor 53.

When this occurs, a charging current starts flowing through a resistor 60 to a second capacitor 61. On the other hand, a mains supply voltage proportional circuit 62 comprises a smoothing circuit formed by resistors 63, 64 and 65 and a capacitor 66 to smooth the output of the full-wave rectifier 51, the voltage at the junction betweenthe resistors 64 and 65 increases when an increase in the mains supply voltage.

Illustrated at 67 is a second comparator which compares the voltage developed at this junction with the voltage developed across the second capacitor 61.

A second comparator 67 compares the voltage at this circuit junction with the voltage developed in the second capacitor 61 and generates a high voltage output when the second capacitor 61 voltage reaches the junction voltage (after the elapse of a predetermined delay time) to trigger the thyristor 53 by way of resistors 68 and 69 which comprise a trigger circuit 70. The turn-on of thyristor 53 causes the first capacitor 56 to discharge through a diode 71 in preparation for the phase control operation during the next cycle of the mains supply voltage.

Figure 6:
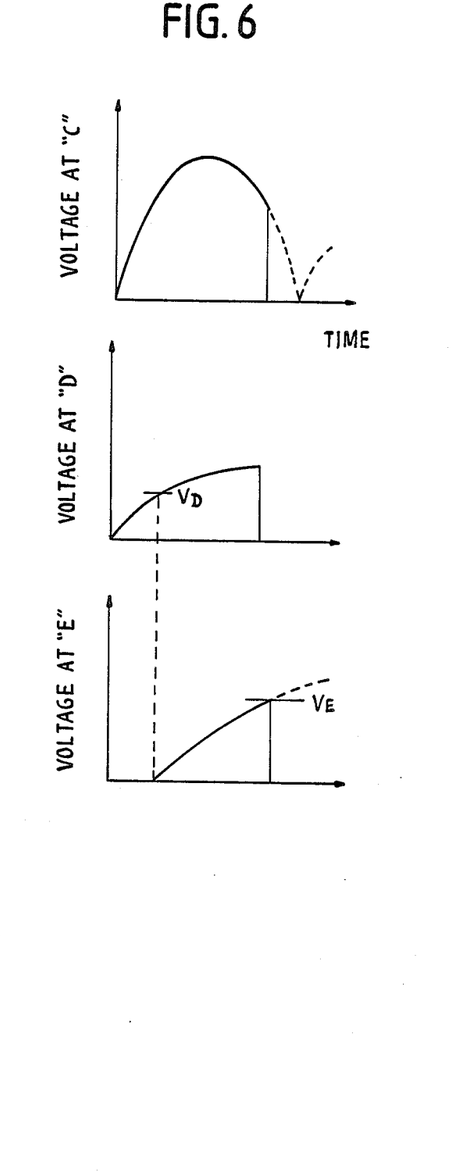
FIG. 6 is a waveform diagram associated with the embodiment of FIG. 5.

FIG. 6 shows waveforms appearing in the circuit of FIG. 3. When the voltage across the first capacitor 56 exceeds a voltage $V_D$, a charging current starts flowing through the second capacitor 61 and when the voltage developed therein exceeds a voltage $V_E$, the thyristor 53 is turned on. At this triggering instant, the voltage at point C has reduced to a low level and the potential at point D is still low. Thus, if the trigger timing is determined by the voltage at point D, the operation of the apparatus would becom unstable. However, the present invention determines the trigger timing during the time the voltage at point C is still rising and therefore a stabilized operation can be obtained.

In addition, an increase in the mains supply voltage causes a corresponding voltage rise in the output of the proportional circuit 62, and as a result the delay time increases correspondingly to maintain the motor speed at a constant value.

Furthermore, the voltage that charges the first capacitor 56 is the difference between the mains supply voltage and the counter EMF of the motor 52, the influence caused by the torque variation of the motor 52 can be reduced to a minimum.

INDUSTRIAL APPLICABILITY

As will be apparent from the foregoing, the motor speed control apparatus of the present invention provides a thyristor in a motor current supply circuit in such a manner that it controls the phase of the motor. When the motor speed is to be reduced by delaying the thyristor trigger timing, the trigger timing occurs at a point in time which is advanced by an amount equal to the interval between the time prior to the occurrence of a speed change and the time following the occurrence of the speed change if the thyristor trigger timing would otherwise be delayed significantly from the zero voltage point of the mains supply. As a result, the motor speed stabilization is ensured even though the speed is low.

Furthermore, the motor speed control apparatus of the present invention includes a full-wave rectifier connected across the terminals of a mains supply to convert the AC voltage to a DC voltage, a motor and a thyristor coupled in a series circuit to the DC output of the full-wave rectifier, a first capacitor arranged to be charged with a voltage impressed upon the terminals of the thyristor, a first comparator for comparing the voltage developed in the first capacitor with a first predetermined voltage, a second capacitor which begins to be charged with the output of the first comparator, a second comparator which compares the voltage developed in the first capacitor with a second predetermined voltage, and a trigger circuit connected to the output of the second comparator for triggering the gate of the thyristor. With this arrangement, even if the actual trigger instant is delayed substantially from the zero cross point of the mains supply, the determination of the trigger timing is made at a point in time advanced by an amount corresponding to the delay time so that the motor speed is stabilized even if it is low.

In addition, the trigger circuit mentioned above discharges the first capacitor by means of a switching means coupled to the output of the second comparator through a resistor to the gate of the thyristor for triggering it. In other words, the energy stored in the first capacitor is utilized for triggering the thyristor, the circuit configuration is simplified and the power requirement of the gating circuit of the thyristor is relaxed.

Furthermore, since the second predetermined voltage mentioned above is derived from a mains supply voltage proportional circuit by rectifying the mains supply voltage, mains voltage fluctuation causes a corresponding variation in the delay time so that the trigger instant is delayed and the motor speed is rendered constant.

What is claimed is:

1. A motor speed control apparatus comprising a full-wave rectifier connected across terminals of an AC supply to convert the AC supply voltage to a DC voltage, a motor and a thyristor coupled in a series circuit to the DC output of the full-wave rectifier, a first capacitor arranged to be charged with a voltage applied to the terminals of the thyristor, a first comparator for comparing the voltage developed in the first capacitor with a first predetermined voltage, a second capacitor charged with an output of the first comparator, a second comparator which compares the voltage developed in the second capacitor with a second predetermined voltage, and a trigger circuit connected to the output of the second comparator triggering the gate of the thyristor.

2. A motor speed control apparatus as claimed in claim 1, wherein said trigger circuit comprises a switching means connected to the output of said second comparator for discharging said first capacitor through a resistor to the gate of said thyristor for triggering the thyristor into conduction and wherein said first predetermined voltage is variable by a reference voltage varying means.

3. A motor speed control apparatus as claimed in claim 1, wherein said second predetermined voltage is derived from a mains supply voltage proportional circuit which generates a voltage proportional to the mains supply voltage by rectifying it.

4. A motor speed control apparatus as claimed in claim 1, further comprising separate voltage source means, separate from said AC supply and said full-wave rectifier for supplying said first predetermined voltage.

5. A motor speed control apparatus as claimed in claim 1, further comprising separate voltage source means, separate from said AC supply and said full-wave rectifier for supplying said second predetermined voltage.

6. A motor speed control apparatus as claimed in claim 5, further comprising separate voltage source means, separate from said AC supply and said full-wave rectifier for supplying said first predetermined voltage.

7. A motor speed control apparatus as claimed in claim 1, wherein said first comparator is connected for comparing the voltage developed in the first capacitor with a first, substantially constant, predetermined voltage level.

8. A motor speed control apparatus as claimed in claim 1, wherein said second comparator is connected for comparing the voltage developed in the second capacitor with a second, substantially constant, predetermined voltage level.

9. A motor speed control apparatus as claimed in claim 8, wherein said first comparator is connected for comparing the voltage developed in the first capacitor with a first, substantially constant, predetermined voltage level.

* * * * *